United States Patent Office 2,872,378
Patented Feb. 3, 1959

2,872,378

THERAPEUTIC COMPOSITIONS CONTAINING IODOPROPYLIDENEGLYCEROL

Lessel Lavan Manchey, Cheltenham, and Verne C. Bidlack, Jr., Levittown, Pa., assignors, by mesne assignments, to The Denver Chemical Manufacturing Company, Stamford, Conn., a corporation of Colorado No Drawing. Application May 10, 1954
Serial No. 428,808

5 Claims. (Cl. 167—70)

This invention relates to new compositions of matter which are useful therapeutically for the administration of iodine in conditions in which iodide ion is therapeutically effective. A wide range of iodine compounds, both inorganic and organic, have been and are used therapeutically. In general, they fall into two distinct classes, (1) those which afford iodide ion, such as the inorganic iodides, and certain organic iodine compounds which afford iodide ion by dissociation or through conversion in the metabolic process to material which affords the effects of the iodide ion, and (2) those in which the iodine is firmly bound to carbon and is not released in the system. The first class of compounds is used for the therapeutic effects of the iodide ion. The second class of materials is used in diagnostic work or as contrast media, serving merely to cause a substantial concentration of an iodine-bearing compound in a particular tissue or organ. The compositions of the present application belong to the first class.

The new compositions of the invention consist of a suitable pharmaceutical carrier together with a compound of the formula

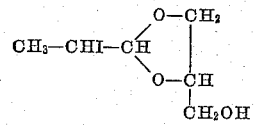

which compound can be termed 1,2-(2-iodopropylidene)glycerol or 2-(1-iodoethyl)-1,3-dioxolane-4-methanol. Herein we shall refer to it as 2-iodopropylideneglycerol for convenience. We have discovered, quite surprisingly, that this compound is quite stable, in the sense that it can be heated to a fairly high temperature, for example, sterilization temperature, or can be treated with such agents as silver carbonate or the diluted caustic alkalies or alkali carbonates, without decomposition. In the process by which we prepare this material, it is formed concomitantly with the compound of the formula

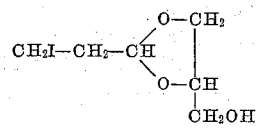

which may be termed 1,2-(3-iodopropylidene)glycerol or 2-(2-iodoethyl)-1,3-dioxolane-4-methanol, which we shall refer to herein as 3-iodopropylideneglycerol for convenience. This latter compound appears to be therapeutically equivalent to the 2-iodopropylideneglycerol, but in contrast with this latter compound it is relatively unstable. Thus, it cannot be heated to sterilization temperatures without decomposition, it is readily destroyed by diluted caustic soda or alkali metal carbonates, and we do not believe that it has the resistance to deterioration on aging which the 2-iodopropylideneglycerol has. However, in certain of the compositions of the invention, we have found it unnecessary to remove this component from the reaction mixture, as, for example, in tablets, capsules or ointments which do not require sterilization, in contrast with parenteral solutions where it is not useful because it is not susceptible of sterilization by heat.

The compositions of the present invention are prepared by reacting iodine with glycerol, advantageously in the presence of an inert solvent such as toluene, and with removal of water during the course of reaction as by the use of a reflux condenser with a trap for the separation of water. The reaction is, we believe, relatively complex.

If the 2-iodopropylideneglycerol is the desired product, the reaction mixture is treated with an alkaline material such as sodium hydroxide, sodium carbonate or sodium bicarbonate, whereby the labile compounds formed, including 3-iodopropylideneglycerol, are destroyed, and the resulting solution is extracted with ether to recover the 2-iodopropylideneglycerol, after which the ether is removed by distillation. Other solvents, including chloroform, isobutyl alcohol, methyl acetate, ethyl acetate, methyl formate, tetrahydrofuran, or the like, may be used instead of ether, the only real limitation being that inasmuch as the solvent is subsequently removed by distillation, it is of advantage to use a low boiling solvent.

If, following the completion of the reaction, the reaction mixture is treated with silver carbonate instead of an alkali metal hydroxide or carbonate, followed by filtration before extraction with the solvent, a mixture relatively high in 3-iodopropylideneglycerol, e. g., up to one-half as much 3-iodopropylideneglycerol as 2-iodopropylideneglycerol, can be obtained.

The observation that the relatively stable 2-iodopropylideneglycerol is effective therapeutically to exert the physiological action of the iodide ion was, we believe, surprising, and its stability leads to pharmaceutical compositions of decided advantage as compared with the organic iodine-containing compositions heretofore available.

The preparation of the iodine-containing compounds, and typical pharmaceutical compositions of the invention, will be illustrated by the following examples.

*Example I*

1000 parts of glycerol, 350 parts of iodine and 20 parts of toluene are introduced into a 3-necked reaction flask fitted with a thermometer, a stirrer and a water-cooled condenser and water-separator. The amount of iodine can be varied from about 200 to about 450 parts per 1000 parts of glycerol. The mixture is heated with stirring to between 115° C. and 135° C. and maintained at this temperature for approximately 18 hours, using a heating mantle. An effective rate of reflux of the toluene is maintained and the water which accumulates in the water separator is drawn off from time to time. After completion of the heating period, the reaction mixture is cooled, treated with about 160 parts of 25% aqueous caustic soda solution and the resulting solution is extracted continuously, using about 360 parts of ether. The ether is then removed by distillation at atmospheric pressure, heating the material on a water-bath. If desired, the distillation may be completed under a vacuum to insure obtaining a nearly anhydrous product. The residue is predominantly 2-iodopropylideneglycerol, a pale yellow liquid with a pungent, bitter aftertaste, density 1.797 grams per cc., refraction index 1.547, analyzing carbon 28.8%, hydrogen 4.4%, oxygen 20.7% and iodine 46.1%.

If instead of treating the reaction mixture with caustic soda, it is treated with an excess of silver carbonate, followed by filtration, and then extraction with ether or other solvent and removal of the ether by distillation, the product obtained is a mixture of 2-iodopropylideneglycerol and 3-iodopropylideneglycerol in ratios which vary from run to run from 67 to 75 parts of the former to 33 to 25 parts of the latter. We have found no way of recovering the 3-iodopropylideneglycerol from its admixture with 2-iodopropylideneglycerol, nor have we found any physical method for the separation of the two. The only method we have found for producing one separate from the other involves treatment of the mixture to destroy the 3-iodopropylideneglycerol and recover the 2-iodopropylideneglycerol.

*Example II*

Compressed tablets were produced from the following:

| | Lb. |
|---|---|
| 2-iodopropylideneglycerol | 7 |
| Kaolin | 71 |
| Dried starch | 29 |
| Powdered sugar | 3 |
| Magnesium stearate | 1 |

The 2-iodopropylideneglycerol was mixed with the kaolin and 10 lb. of the dried starch and screened. A granulating paste was prepared by heating the sugar and 4 lb. of the starch with 3 gallons of water. The first mixture was granulated using this paste, screened while wet, dried and again screened. The remainder of the starch and the magnesium stearate were then mixed with the granulated product and the resulting mixture compressed into tablets. Instead of the 2-iodopropylideneglycerol, the mixed isomers may be used in like amount, as we have found that therapeutically the mixture is substantially equivalent to the pure 2-iodopropylideneglycerol, and that the 3-iodopropylideneglycerol, if not present to an extent greater than about one-half the amount of 2-iodopropylideneglycerol, does not objectionably decompose during tableting.

*Example III*

7 lb. of 2-iodopropylideneglycerol and 9 lb. of polyethylene glycol 400 U. S. P. are mixed and encapsulated in soft or elastic gelatine capsules. The mixed isomers may be substituted in like amount for the 2-iodopropylideneglycerol.

In Example II and Example III the amounts given are for the production of 100,000 tablets or capsules.

*Example IV*

An ointment is prepared from the following:

| | Parts |
|---|---|
| Iodopropylideneglycerol, mixed isomers | 10 |
| Polyethylene glycol 4000 | 50 |
| Polyethylene glycol 400 | 30 |
| Sorbitan monopalmitate | 1 |
| Distilled water | 9 |

In preparing this ointment the sorbitan monopalmitate is dissolved in the polyethylene glycol 4000 by heating at 60 to 65° C. in a steam-jacketed kettle. At the same time, the iodopropylideneglycerol mixed isomers are added with stirring to the polyethylene glycol 400 heated to 60 to 65° C., after which the water is added. The two solutions are then commingled with stirring, transferred to another vessel and stirred until the liquid congeals.

*Example V*

A parenteral solution is prepared from the following:

| | | |
|---|---|---|
| 2-iodopropylideneglycerol | gm | 50.0 |
| Propylene glycol | ml | 500.0 |
| Methyl (p-hydroxybenzoate) | gm | 1.8 |
| Propyl (p-hydroxybenzoate) | gm | 0.3 |
| Water for injection, enough to make 1000.0 ml. | | |

The 2-iodopropylideneglycerol and the benzoates are dissolved in the propylene glycol. To the resulting solution is added slowly, with stirring, the required quantity of water. The mixture is allowed to stand for approximately 10 days, is clarified by filtration or centrifugation, filled into ampules or vials and heat sterilized at 120° C. The mixed isomers cannot be used in solutions of this type because of decomposition during sterilization.

We claim:

1. A pharmaceutical composition containing a pharmaceutical carrier and an iodine-containing composition consisting essentially of 1,2-(2-iodopropylidene)glycerol and not more than about 50%, based on the 1,2-(2-iodopropylidene)glycerol, of 1,2-(3-iodopropylidene)glycerol, said pharmaceutical composition being substantially free from other iodine-containing compounds, being stable and, on administration, releasing iodide ion through metabolic action, said pharmaceutical carrier being one of the carriers (1) a comminuted carrier on which the iodine-containing composition is adsorbed and compressed into a tablet and (2) a solvent in which the iodine-containing composition is dissolved and the solution contained in a soft gelatin capsule.

2. A composition as in claim 1 which is substantially free of 1,2-(3-iodopropylidene)glycerol.

3. A composition as in claim 2 in the form of a compressed tablet, containing the 1,2-(2-iodopropylidene) glycerol adsorbed on a comminuted carrier.

4. A composition as in claim 2 in which the 1,2-(2-iodopropylidene)glycerol is admixed with a solvent and contained in a soft gelatin capsule.

5. 1,2-(2-iodopropylidene)glycerol substantially free from other iodine-containing compounds, and being in the form of a pale yellow liquid with a pungent, bitter after taste, having a density of about 1.797 grams per cc., a refractive index of about 1.547, and analyzing carbon about 28.8%, hydrogen about 4.4%, oxygen about 20.7% and iodine about 46.1%.

References Cited in the file of this patent

UNITED STATES PATENTS

| Re. 13,462 | Werner | Aug. 27, 1912 |
| 888,758 | Slakk | May 26, 1908 |
| 1,767,667 | Gray | June 24, 1930 |
| 2,260,261 | Morey | Oct. 21, 1941 |

OTHER REFERENCES

Fieser et al.: Organic Chem., 2nd ed., 1950, pp. 148–152, Heath and Co., Boston.

Trademark 553,478, January 15, 1952.

Evlampiev, Chem. Abst., vol. 32, pp. 5377–78 (1938).

Extra Pharmacopeia, 19th ed., 1928, p. 512, "Glycerinum Iodi."